United States Patent
Vajravel

(10) Patent No.: US 9,971,726 B2
(45) Date of Patent: May 15, 2018

(54) SESSION-LEVEL-RESTRICTION FOR UNIVERSAL SERIAL BUS STORAGE DEVICES

(71) Applicant: Dell Products L.P., Round Rock, TX (US)

(72) Inventor: Gokul Thiruchengode Vajravel, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 266 days.

(21) Appl. No.: 14/528,655

(22) Filed: Oct. 30, 2014

(65) Prior Publication Data

US 2016/0125205 A1 May 5, 2016

(51) Int. Cl.
*G06F 13/40* (2006.01)
*G06F 21/78* (2013.01)

(52) U.S. Cl.
CPC ...... *G06F 13/4072* (2013.01); *G06F 13/4095* (2013.01); *G06F 21/78* (2013.01)

(58) Field of Classification Search
CPC ............................. G06F 13/4072; G06F 21/78
See application file for complete search history.

(56) References Cited

U.S. PATENT DOCUMENTS

| | | | | |
|---|---|---|---|---|
| 2006/0184806 A1* | 8/2006 | Luttmann | ........... | G06F 12/1466 713/193 |
| 2007/0233869 A1* | 10/2007 | Jodh | ........... | H04L 63/10 709/226 |
| 2010/0125714 A1* | 5/2010 | Mehra | ........... | G06F 3/0607 711/166 |
| 2010/0241772 A1* | 9/2010 | Kugimoto | ........... | G06F 9/4445 710/63 |
| 2011/0289596 A1* | 11/2011 | Sebesta | ........... | G06F 3/0622 726/28 |
| 2013/0111561 A1* | 5/2013 | Kaushik | ........... | H04L 63/105 726/4 |
| 2013/0198474 A1* | 8/2013 | Shaath | ........... | G06F 12/1466 711/163 |

OTHER PUBLICATIONS

Microsoft, "DefineDosDevice function", Windows Dev. Center, 3 pages, available at https://msdn.microsoft.com/en-us/library/windows/desktop/aa363904(v=vs.85).aspx, 2015.

(Continued)

*Primary Examiner* — Tim T Vo
*Assistant Examiner* — Herve Iradukunda
(74) *Attorney, Agent, or Firm* — Baker Botts L.L.P.

(57) ABSTRACT

A system and method of implementing SLR for a USB device of an information handling system is disclosed herein. An OS may load a disk driver stack and a volume driver stack for the USB device, where the USB device is being enumerated by a first driver. The OS may load a second driver on the disk driver stack. The OS may also load second driver on the volume driver stack. The OS may restrict an access to the USB device at the second driver as loaded on the disk driver stack. Furthermore, the OS may restrict an access to a volume of the USB device at the second driver as loaded on the volume driver stack.

19 Claims, 4 Drawing Sheets

(56) References Cited

OTHER PUBLICATIONS

Microsoft, "Defining an MS-DOS Device Name", Windows Dev. Center, 1 page, available at https://msdn.microsoft.com/en-us/library/windows/destop/aa363908(v=vs.85).aspx, 2015.
Microsoft, "Filter Drivers (Window Drivers)", 1 page, available at https://msdn.microsoft.com/en-us/library/windows/hardware/ff545890(v=vs.85).aspx, 2015.
Microsoft, "IOCTL_MOUNTDEV_LINK_CREATED control code (Windows Drivers)", 1 pages, available at https://msdn.microsoft.com/en-us/library/windows/hardware/ff560434(v=vs.85).aspx, 2015.
Microsoft, "IOCTL_MOUNTMGR_DELETE_POINTS control code (Windows Drivers)", 1 page, available at https://msdn.microsoft.com/en-us/library/windows/hardware/ff560461(v=vs.85).aspx, 2015.
Microsoft, "IOCTL_MOUNTMGR_QUERY_POINTS control code (Windows Drivers)", 2 pages, available at https://msdn.microsoft.com/en-us/library/windows/hardware/ff560474(v=vs.85).aspx, 2015.
Microsoft, "IOCTL_STORAGE_GET_DEVICE_NUMBER control code (Windows)", Windows Dev. Center, 2 pages, available at https://msdn.microsoft.com/en-us/library/windows/desktop/bb968800(v=vs.85).aspx, 2015.
Microsoft, "IoGetDeviceObjectPointer routine (Windows Drivers)", 2 pages, available at https://msdn.microsoft.com/en-us/library/windows/hardware/ff549198(v=vs.85).aspx, 2015.
Microsoft, "IoReportTargetDeviceChange routine (Windows Drivers)", 2 pages, available at https://msdn.microsoft.com/en-us/library/windows/hardware/ff549625(v=vs.85).aspx, 2015.
Microsoft, "IoReportTargetDeviceChangeAsynchronous routine (Windows Drivers)", 2 pages, available at https://msdn.microsoft.com/en-us/library/windows/hardware/ff549634(v=vs.85).aspx, 2015.
Microsoft, "System-Defined Device Setup Classes Available to Vendors (Windows Drivers)", 5 pages, available at https://msdn.microsoft.com/en-us/library/windows/hardware/ff553426(v=vs.85).aspx, 2015.
SimplyCore LLC, "USB Redirector TS Edition v2.4 User Manual", www.incentivespro.com, 2 pages, available at http:////www.incentivespro.com/helps/usb-redirector-ts-ts/features_isolation.htm, 2014.
USB Secure®, USB Secure User Guide, NewSoftwares.net, 29 pages, 2014.

* cited by examiner

SESSION-LEVEL-RESTRICTION FOR UNIVERSAL SERIAL BUS STORAGE DEVICES

TECHNICAL FIELD

This disclosure relates generally to information handling systems and, more particularly, to Universal Serial Bus (USB) storage devices having multiple device driver stacks.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more information handling systems, data storage systems, and networking systems.

SUMMARY

Brief Description of the Drawings

For a more complete understanding of the present invention and its features and advantages, reference is now made to the following description, taken in conjunction with the accompanying drawings, in which.

DETAILED DESCRIPTION

Figure 1:
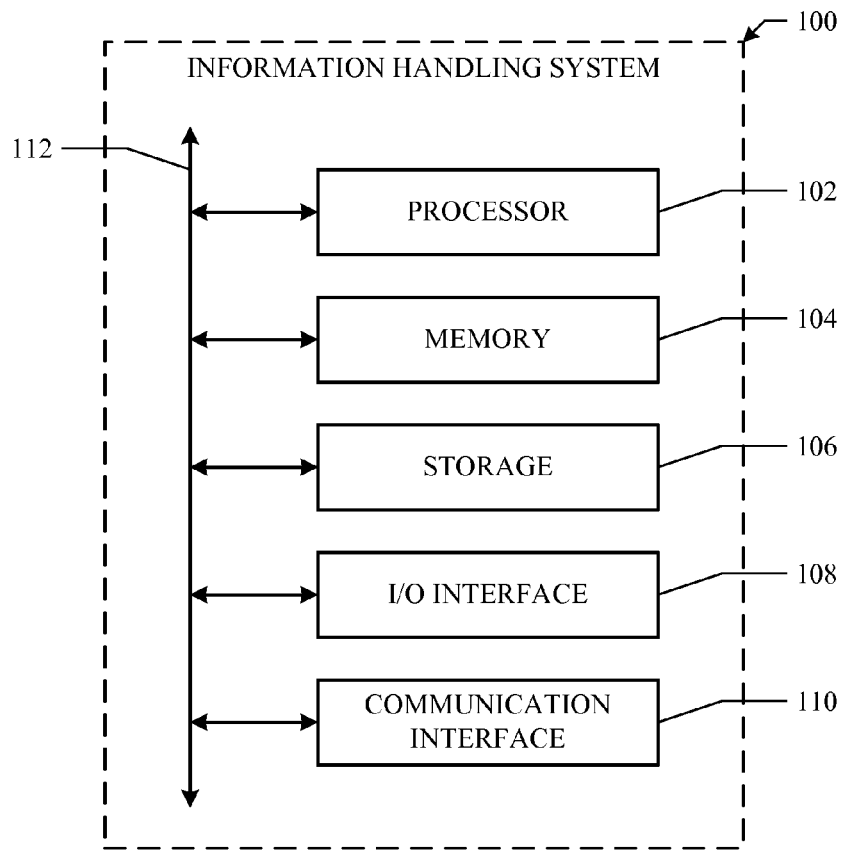
FIG. 1 is a block diagram of selected elements of an information handling system.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Figure 2:
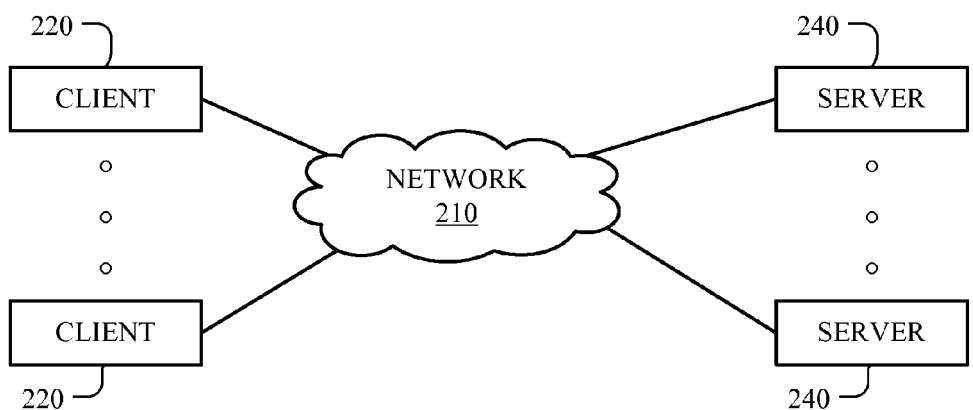
FIG. 2 is an example of a network environment.

Particular embodiments are best understood by reference to FIGS. 1-2, wherein like numbers are used to indicate like and corresponding parts.

FIG. 1 illustrates an example information handling system 100. In particular embodiments, one or more information handling systems 100 perform one or more steps of one or more methods described or illustrated herein. In particular embodiments, one or more information handling systems 100 provide functionality described or illustrated herein. In particular embodiments, software running on one or more information handling systems 100 performs one or more steps of one or more methods described or illustrated herein or provides functionality described or illustrated herein. Particular embodiments include one or more portions of one or more information handling systems 100. Herein, reference to an information handling system may encompass a computing device, and vice versa, where appropriate. Moreover, reference to an information handling system may encompass one or more information handling systems, where appropriate.

This disclosure contemplates any suitable number of information handling systems 100. This disclosure contemplates information handling system 100 taking any suitable physical form. As example and not by way of limitation, information handling system 100 may be an embedded information handling system, a system-on-chip (SOC), a single-board information handling system (SBC) (such as, for example, a computer-on-module (COM) or system-on-module (SOM)), a desktop information handling system, a laptop or notebook information handling system, an interactive kiosk, a mainframe, a mesh of information handling systems, a mobile telephone, a personal digital assistant (PDA), a server, a tablet information handling system, or a combination of two or more of these. Where appropriate, information handling system 100 may include one or more information handling systems 100; be unitary or distributed; span multiple locations; span multiple machines; span multiple data centers; or reside in a cloud, which may include one or more cloud components in one or more networks. Where appropriate, one or more information handling systems 100 may perform without substantial spatial or temporal limitation one or more steps of one or more methods described or illustrated herein. As an example and not by way of limitation, one or more information handling systems 100 may perform in real time or in batch mode one or more steps of one or more methods described or illustrated herein. One or more information handling systems 100 may perform at different times or at different locations one or more steps of one or more methods described or illustrated herein, where appropriate.

In particular embodiments, information handling system 100 includes a processor 102, memory 104, storage 106, an input/output (I/O) interface 108, a communication interface 110, and a bus 112. Although this disclosure describes and illustrates a particular information handling system having a particular number of particular components in a particular arrangement, this disclosure contemplates any suitable information handling system having any suitable number of any suitable components in any suitable arrangement.

In particular embodiments, processor 102 includes hardware for executing instructions, such as those making up a computer program. As an example and not by way of limitation, to execute instructions, processor 102 may retrieve (or fetch) the instructions from an internal register, an internal cache, memory 104, or storage 106; decode and execute them; and then write one or more results to an internal register, an internal cache, memory 104, or storage 106. In particular embodiments, processor 102 may include one or more internal caches for data, instructions, or addresses. This disclosure contemplates processor 102 including any suitable number of any suitable internal caches, where appropriate. As an example and not by way of limitation, processor 102 may include one or more instruction caches, one or more data caches, and one or more translation lookaside buffers (TLBs). Instructions in the instruction caches may be copies of instructions in memory 104 or storage 106, and the instruction caches may speed up retrieval of those instructions by processor 102. Data in the data caches may be copies of data in memory 104 or storage 106 for instructions executing at processor 102 to operate on; the results of previous instructions executed at processor 102 for access by subsequent instructions executing at processor 102 or for writing to memory 104 or storage 106; or other suitable data. The data caches may speed up read or write operations by processor 102. The TLBs may speed up virtual-address translation for processor 102. In particular embodiments, processor 102 may include one or more internal registers for data, instructions, or addresses. This disclosure contemplates processor 102 including any suitable number of any suitable internal registers, where appropriate. Where appropriate, processor 102 may include one or more arithmetic logic units (ALUs); be a multi-core processor; or include one or more processors 102. Although this disclosure describes and illustrates a particular processor, this disclosure contemplates any suitable processor.

In particular embodiments, memory 104 includes main memory for storing instructions for processor 102 to execute or data for processor 102 to operate on. As an example and not by way of limitation, information handling system 100 may load instructions from storage 106 or another source (such as, for example, another information handling system 100) to memory 104. Processor 102 may then load the instructions from memory 104 to an internal register or internal cache. To execute the instructions, processor 102 may retrieve the instructions from the internal register or internal cache and decode them. During or after execution of the instructions, processor 102 may write one or more results (which may be intermediate or final results) to the internal register or internal cache. Processor 102 may then write one or more of those results to memory 104. In particular embodiments, processor 102 executes only instructions in one or more internal registers or internal caches or in memory 104 (as opposed to storage 106 or elsewhere) and operates only on data in one or more internal registers or internal caches or in memory 104 (as opposed to storage 106 or elsewhere). One or more memory buses (which may each include an address bus and a data bus) may couple processor 102 to memory 104. Bus 112 may include one or more memory buses, as described below. In particular embodiments, one or more memory management units (MMUs) reside between processor 102 and memory 104 and facilitate accesses to memory 104 requested by processor 102. In particular embodiments, memory 104 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 104 may include one or more memories 104, where appropriate. Although this disclosure describes and illustrates particular memory, this disclosure contemplates any suitable memory.

In particular embodiments, storage 106 includes mass storage for data or instructions. As an example and not by way of limitation, storage 106 may include a hard disk drive (HDD), a floppy disk drive, flash memory, an optical disc, a magneto-optical disc, magnetic tape, or a USB drive or a combination of two or more of these. Storage 106 may include removable or non-removable (or fixed) media, where appropriate. Storage 106 may be internal or external to information handling system 100, where appropriate. In particular embodiments, storage 106 is non-volatile, solid-state memory. In particular embodiments, storage 106 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 106 taking any suitable physical form. Storage 106 may include one or more storage control units facilitating communication between processor 102 and storage 106, where appropriate. Where appropriate, storage 106 may include one or more storages 106. Although this disclosure describes and illustrates particular storage, this disclosure contemplates any suitable storage.

In particular embodiments, I/O interface 108 includes hardware, software, or both, providing one or more interfaces for communication between information handling system 100 and one or more I/O devices. Information handling system 100 may include one or more of these I/O devices, where appropriate. One or more of these I/O devices may enable communication between a person and information handling system 100. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 108 for them. Where appropriate, I/O interface 108 may include one or more device or software drivers enabling processor 102 to drive one or more of these I/O devices. I/O interface 108 may include one or more I/O interfaces 108, where appropriate. Although this disclosure describes and illustrates a particular I/O interface, this disclosure contemplates any suitable I/O interface.

In particular embodiments, communication interface 110 includes hardware, software, or both providing one or more interfaces for communication (such as, for example, packet-based communication) between information handling system 100 and one or more other information handling systems 100 or one or more networks. As an example and not by way of limitation, communication interface 110 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 110 for it. As an example and not by way of limitation, information handling system 100 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, information handling system 100 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Information handling system 100 may include any suitable communication interface 110 for any of these networks, where appropriate. Communication interface 110 may include one or more communication interfaces 110, where appropriate. Although this disclosure describes and illustrates a particular communication interface, this disclosure contemplates any suitable communication interface.

In particular embodiments, bus 112 includes hardware, software, or both coupling components of information handling system 100 to each other. As an example and not by way of limitation, bus 112 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 112 may include one or more buses 112, where appropriate. Although this disclosure describes and illustrates a particular bus, this disclosure contemplates any suitable bus or interconnect.

FIG. 2 illustrates an example configuration of networked information handling systems (e.g. client devices and servers). In particular embodiments, one or more client devices 220 and one or more servers 240 are connected via network 210. Network 210 may be a public network or a private (e.g. corporate) network. Additionally, network 210 may, for example, be a Local Area Network (LAN), a Wide Area Network (WAN), a wireless network, the Internet, an intranet or any other suitable type of network. In particular embodiments, network 210 may include one or more routers for routing data between client devices 220 and/or servers 240. A device (e.g., a client device 220 or a server 240) on network 210 may be addressed by a corresponding network address including, for example, an Internet protocol (IP) address, an Internet name, a Windows Internet name service (WINS) name, a domain name or other system name. In particular embodiments, network 210 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client devices 220 may communicate with one or more servers 240 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Client device 220 may be a desktop computer, a laptop computer, a tablet computer, a handheld device, a mobile phone, a kiosk, a vending machine, a billboard, or any suitable information handling system. In particular embodiments, a client device 220 is an embedded computer and may have flash memory (e.g. a solid state drive) instead of a hard disk drive. In particular embodiments, a client device 220 is a thin client having limited processing capabilities and limited storage, and such a thin client may require minimal management and updates. A client device 220 may communicate with a server 240 via one or more protocols such as Hypertext Transfer Protocol (HTTP), Hypertext Transfer Protocol Secure (HTTPS), File Transfer Protocol (FTP), Common Internet File System (CIFS), Independent Computing Architecture (ICA) protocol (developed by Citrix Systems, Inc.), Remote Desktop Protocol (RDP) (developed by Microsoft Corporation), or any suitable protocol or combination of protocols.

A server 240 may include one or more of: a computing device, a desktop computer, a laptop computer, a database, a corporate server, a repository server, a configuration application server, a domain name system (DNS) server, a dynamic host configuration protocol (DHCP) server, a virtual machine (e.g., VMware® Virtual Machine), a desktop session (e.g., Microsoft Terminal Server), a published application (e.g., Microsoft Terminal Server), or any suitable information handling system. As an example, a private (e.g. corporate) network may include a device manager server and a repository server each configured to communicate with multiple client devices 220 across one or more domains, sites, or subnets of network 210. In particular embodiments, a server 240 may include one or more servers, or functions of one or more servers. A client device 220 may access software resources provided by a server 240 such as, for example, operating systems, add-ons, content, or any other suitable data, applications, or images. In particular embodiments, a client 220 may access resources provided by a server 240 only after providing suitable authentication information. Alternatively, a server 240 may provide software or other resources automatically to one or more client devices 220.

It may be desirable, in the case of a private (e.g. corporate) network including multiple sites or subnets to deploy software (including, e.g., all or part of one or more operating systems, applications, add-ons, or data) to one or more client devices 220 across one or more sites or subnets. The client devices 220 may, for example, be located remotely from one or more servers 240 (including, e.g., device managers or resource repositories), and as such, there may be challenges in deploying software or other resources to the client devices. As an example, limited connectivity or limited speed due to bandwidth constraints or network latencies may create delays in deploying software. As another example, remote sites or subnets may not include managed components or may not have any personnel with information technology expertise necessary to implement software deployment to client devices at the sites or subnets. Additionally, as the size of operating system images or other content (e.g. videos) increases, deploying software or other data to remote sites or subnets may be further delayed. These issues may be further exacerbated in the case of embedded computers such as thin clients, which may have limited processing capability and limited storage space. Traditional approaches involving using a static remote software repository for each subnet or site may not be feasible due to cost or management and monitoring requirements.

In particular embodiments, one or more servers 240 of a network 210 may include a device manager that may manage one or more client devices 220 (e.g. thin clients) of one or more sites or subnets of the network. The device manager may, for example, be a software-based management tool that allows for software imaging, software updates, and software configurations to be deployed to the clients from one or more servers. The device manager may also perform any other suitable management function to manage client devices including, for example, enabling or performing (e.g. automatically) device discovery, tracking of assets (e.g. hardware or software inventory) at client devices, monitoring the status or health of client devices, applying one or more policies to client devices (including, e.g., network settings of the client devices), or remote administration and shadowing of client devices. The device manager may deliver any suitable resources including, for example, operating systems, add-ons, content, or any other suitable data, applications, or images to one or more thin client devices 220 of network 210.

In particular embodiments, a client device such as client device 220 (e.g. a thin client) may be designed with minimal or limited storage capacity (e.g. in a hard disk). The client device may be required, however, to run an operating system such as WINDOWS EMBEDDED or WINDOWS SERVER, but the footprint of such an operating system may grow over time with newer releases or updates. Hence, client devices may, over time, begin to run low on free storage space (e.g. in the hard disk). Unwanted files may be deleted or full volume compression of the storage medium (e.g. the hard disk) may be implemented to increase available storage space. However, full volume compression may introduce performance shortcomings (e.g. increased number of instruction cycles required to compress/uncompress data in the volume) from the point of view of an end user of the client device. In particular embodiments, optimized volume compression may be implemented to reduce effective disk usage on a client device while minimizing impact on system performance.

In particular embodiments, client device 220 (e.g. a thin client, a slim client, or a lean client) or one or more software components associated with client device 220 may depend on server 240 to fulfill its computational roles. As an example of a Virtual Desktop Infrastructure (VDI) and not by way of limitation, client device 220 may provide one or more terminal services to one or more users of client device 220. As such, the users of client device 220 may login to the same server 240 and perform tasks on the same server 240 substantially at the same time. In the VDI, one or more I/O devices may be connected to client device 220. In particular embodiments, in order for the I/O devices to work seamlessly, communications associated with the I/O devices may be redirected to a Virtual Desktop (VD) operating system (OS) or a Virtual Machine (VM) OS (e.g. WINDOWS SERVER 2003) of the VDI. Furthermore, communications for one or more of the I/O devices may be restricted (i.e. limited) only to a particular user session, as in session-level-restriction (SLR) or session-isolation.

SLR may be implemented for many types of I/O devices such as for example, printers, scanners, and storage devices (e.g. mass storage, pen drive, hard drive, compact disc (CD), digital video disc (DVD), and BLU-RAY disc). As an example and not by way of limitation, SLR may be implemented for an I/O device that is being operated by a current user or a current user session in a VM OS. In particular embodiments, a third-party kernel filter driver may be layered (i.e. loaded) on top of every device class of the I/O device. Accordingly, one or more of the symbolic links in the device stack (of the I/O device) may be moved from global namespace to a pre-determined namespace of the user session. Furthermore, the third-party kernel filter driver may block other user sessions (i.e. I/O requests of the other user sessions) operating in the VM OS from accessing the device stack. As such, the I/O device may only be accessible by the current user or the current user session.

In particular embodiments, a SLR-enabled I/O device may include a single device class (i.e. driver) stack. As an example and not by way of limitation, a SLR-enabled USB printer may be associated with a printer device driver stack or a printer class stack (e.g. WINDOWS Printer Class). As such, the third-party kernel filter driver may only handle the printer device driver stack. Herein, reference to a third-party kernel filter driver may encompass a SLR filter driver, or vice-versa, where appropriate. Herein, reference to a device class stack may encompass a device driver stack, or vice-versa, where appropriate. In particular embodiments, a SLR-enabled I/O device may have two or more device driver stacks. Furthermore, the device driver stacks may be handled in a coordinated manner. As an example and not by way of limitation, a SLR-enabled USB storage device may include a disk driver stack and a volume driver stack. As another example and not by way of limitation, both disk driver stack and volume driver stack may be handled in a manner as described and illustrated in FIG. 5. In particular embodiments, the disk driver stack may manage a specific device type such as for example, disk or optical. In particular embodiments, the volume driver stack may present one or more volumes of the storage device to users of the VM OS. In particular embodiments, the volume driver stack may support basic or dynamic disks (e.g. redundant array of inexpensive disks (RAID)). In order to restrict both raw disk access and volume level access to the USB storage device (i.e. limit the accesses to a user session), the SLR filter driver may handle the disk driver stack and the volume driver stack in a coordinated manner. In particular embodiments, referencing the SLR-enabled USB storage device, a file-system driver stack may be mounted on top of the disk driver stack and the volume driver stack based at least on a configuration by a user or an administrator of the VM OS.

Figure 3:
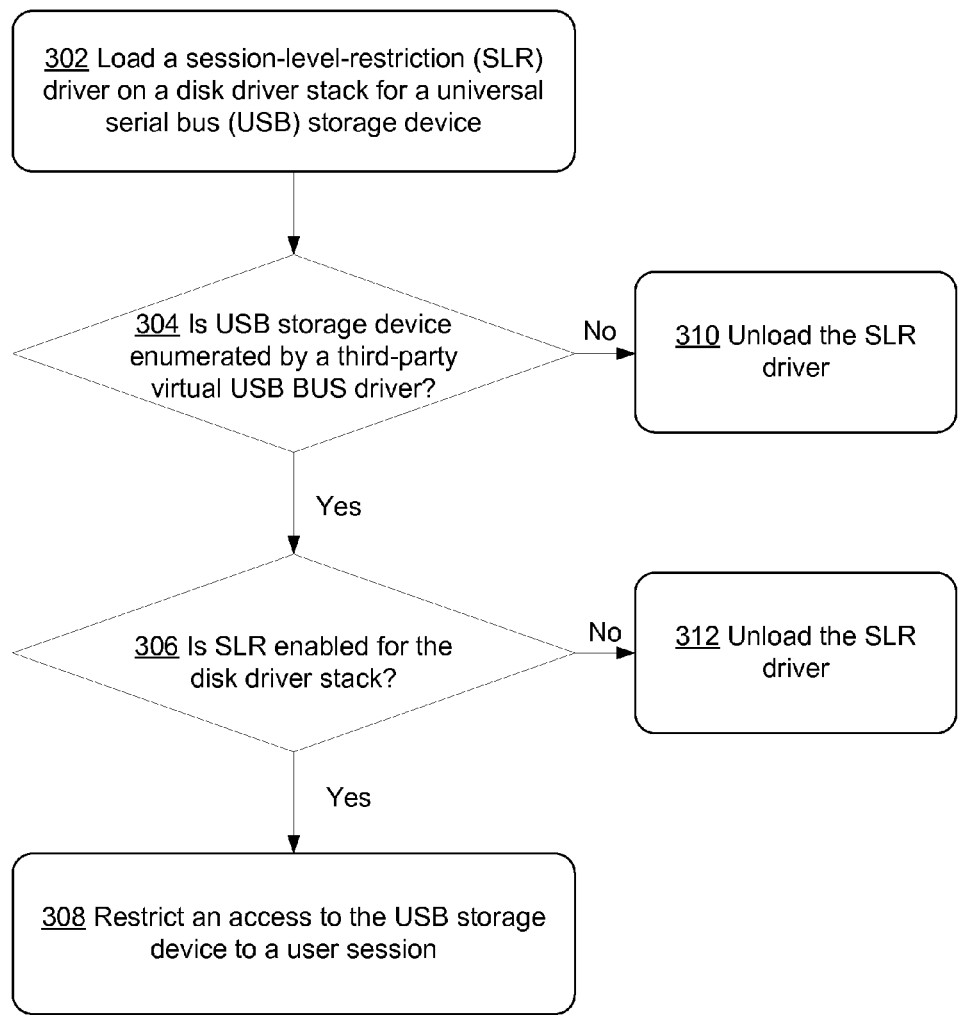
FIG. 3 is an example of a method to filter a disk driver stack of a USB storage device.

FIG. 3 illustrates an exemplary method to filter a disk driver stack of a USB storage device. In the example of FIG. 3, the USB storage device may operate in a VM OS (e.g. WINDOWS SERVER 2003) associated with client device 220. Herein, one or more of steps 302-312 may be operated by the VM OS, where appropriate. In step 302 of FIG. 3, a SLR driver (i.e. SLR filter driver) may be loaded on a disk driver stack for the USB storage device. As an example and not by way of limitation, the SLR driver may be DELL WYSE's TSREST.SYS. In particular embodiments, the disk driver stack may include one or more class filter drivers (e.g. disk, CD, DVD, or BLU-RAY class filter driver), one or more disk upper filter drivers, other suitable disk driver, or any suitable combination thereof associated with the VM OS for the USB storage device. As an example and not by way of limitation, one of the drivers in the disk driver stack may be WINDOWS SERVER 2003's USBSTOR.SYS. As another example and not by way of limitation, the disk driver stack may include DISK.SYS or CDROM.SYS. In step 304 of FIG. 3, the VM OS may determine whether the USB storage device is enumerated by a third-party Virtual USB BUS driver. As an example and not by way of limitation, the third-party Virtual USB BUS driver may be DELL WYSE's Virtual USB BUS driver/enumerator. If the third-party USB storage device is not enumerated by the third-party Virtual USB BUS driver, referencing step 310 of FIG. 3, the VM OS may unload the SLR driver. In contrast, if the third-party USB storage device is enumerated by the third-party Virtual USB BUS driver, referencing step 306 of FIG. 3, the VM OS may check whether SLR is enabled for the disk driver stack. If SLR is not enabled, referencing step 312 of FIG. 3, the VM OS may unload the SLR driver. However, if SLR is enabled for the disk driver stack, referencing step 308 of FIG. 3, the VM OS may limit an access to the USB storage device to a user or a current session of the user (i.e. a current user session). In particular embodiments, the VM OS may limit the access to the USB storage device to a pre-determined user session (e.g. session 1). In particular embodiments, the VM OS may restrict the access to the USB storage, by other users or other user sessions of the VM OS. Although this disclosure describes and illustrates particular steps of FIG. 3 as occurring in a particular order, this disclosure contemplates any suitable steps of FIG. 3 occurring in any suitable order. Moreover, although this disclosure describes and illustrates an example method for filtering particular disk driver stack of particular USB storage device including the particular steps of FIG. 3, this disclosure contemplates any suitable method for filtering any suitable disk driver stack of any suitable USB storage device including any suitable steps, which may include all, some, or none of the steps of FIG. 3, where appropriate. Furthermore, although this disclosure describes and illustrates particular components, devices, or systems carrying out particular steps of FIG. 3, this disclosure contemplates any suitable combination of any suitable components, devices, or systems carrying out any suitable steps of FIG. 3.

Figure 4:
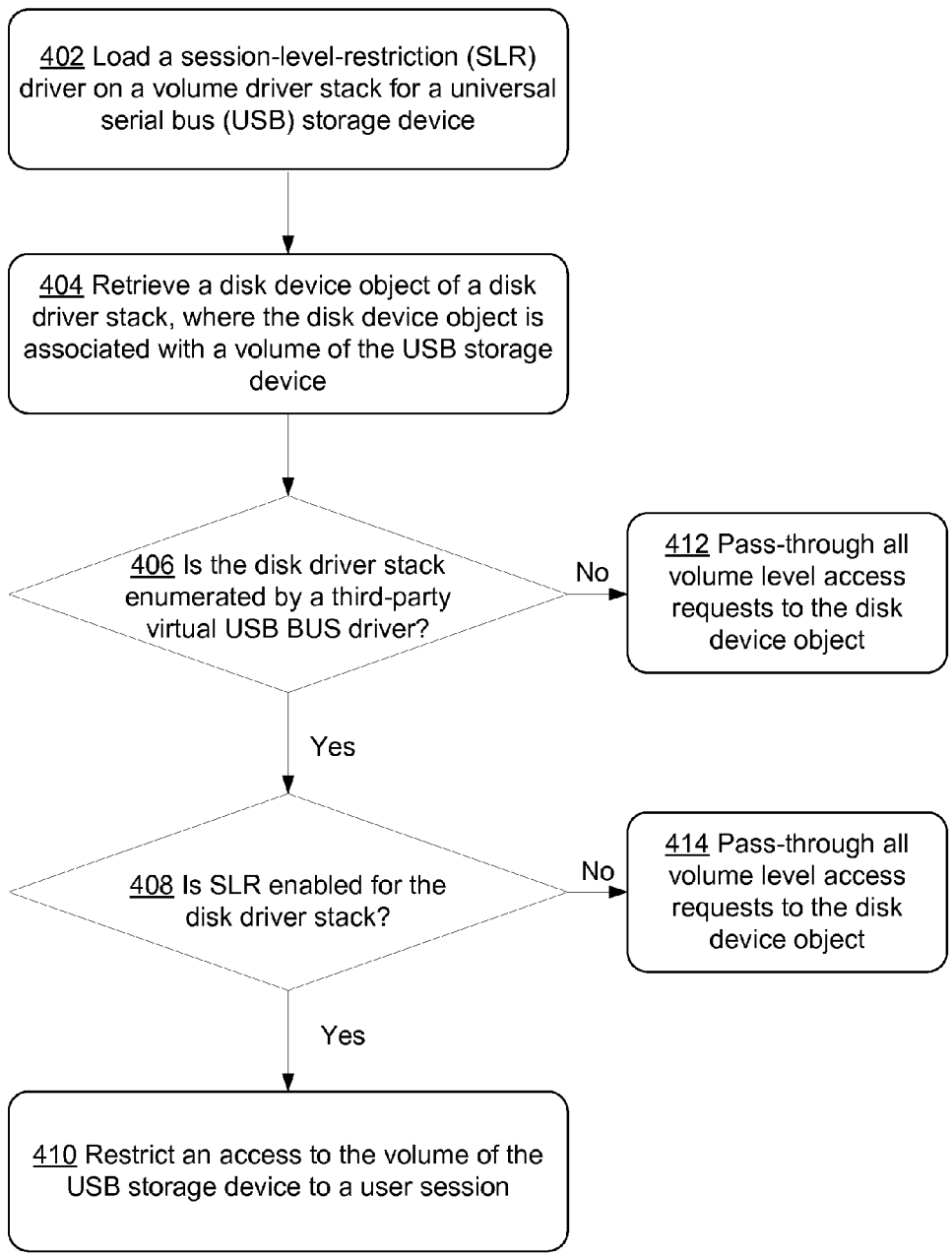
FIG. 4 is an example of a method to filter a volume driver stack of a USB storage device.

FIG. 4 illustrates an example method to filter a volume driver stack of a USB storage device. In the example of FIG. 4, the USB storage device may operate in a VM OS (e.g. WINDOWS SERVER 2003) associated with client device 220. Herein, one or more of steps 402-414 may be operated by the VM OS, where appropriate. In step 402 of FIG. 4, a SLR driver (i.e. SLR filter driver) may be loaded on a volume driver stack for the USB storage device. In particular embodiments, the SLR driver may be the SLR driver of FIG. 3. As an example and not by way of limitation, the SLR driver may be DELL WYSE's TSREST.SYS. In particular embodiments, the volume driver stack may include one or more volume upper filter drivers (e.g. VOLSNAP.SYS), a volume manager driver, other suitable volume driver, or any suitable combination thereof associated with the VM OS for the USB storage device. In step 404 of FIG. 4, the VM OS may retrieve a disk device object of a disk driver stack (e.g. disk driver stack of FIG. 3), where the disk device object may be associated with a pre-determined volume (i.e. storage partition) of the USB storage device. As an example and not by way of limitation, referencing WINDOWS-based OSes, the disk driver stack (i.e. WINDOWS disk stack) may be found by issuing IOCTL_STORAGE_GET_DEVICE_NUMBER routine to a lower driver in the plug-and-play (PnP) start completion routine. Accordingly, the IOCTL_STORAGE_GET_DEVICE_NUMBER may return a storage number corresponding to the pre-determined volume of the USB storage device. Next, by issuing a command "\\.\PhysicalDrive<x>" where <x> is the storage number, a symbolic link may be formed corresponding to the storage number. Thereafter, a disk device object of the associated disk driver stack may be obtained by issuing IoGetDeviceObjectPointer routine with an input argument based on the symbolic link. In step 406 of FIG. 4, the VM OS may determine whether the disk driver stack is enumerated by a third-party Virtual USB BUS driver. As an example and not by way of limitation, the third-party Virtual USB BUS driver may be DELL WYSE's Virtual USB BUS driver/enumerator. If the third-party USB storage device is not enumerated by the third-party Virtual USB BUS driver, referencing step 412 of FIG. 4, the VM OS may pass-through all I/O volume level access requests (for the pre-determined volume of the USB storage device) to the retrieved disk device object. In contrast, if the third-party USB storage device is enumerated by the third-party Virtual USB BUS driver, referencing step 408 of FIG. 4, the VM OS may check whether SLR is enabled for the disk driver stack. If SLR is not enabled, referencing step 414 of FIG. 4, the VM OS may pass-through all I/O volume level access requests (for the pre-determined volume of the USB storage device) to the retrieved disk device object. However, if SLR is enabled for the disk driver stack, referencing step 410 of FIG. 4, the VM OS may limit an access to the pre-determined volume of the USB storage device to a user or a current session of the user (i.e. a current user session). In particular embodiments, the VM OS may limit the access to the pre-determined volume of the USB storage device to a pre-determined user session (e.g. session 1). In particular embodiments, the VM OS may restrict access to the pre-determined volume of the USB storage, by other users or other user sessions of the VM OS. Although this disclosure describes and illustrates particular steps of FIG. 4 as occurring in a particular order, this disclosure contemplates any suitable steps of FIG. 4 occurring in any suitable order. Moreover, although this disclosure describes and illustrates an example method for filtering particular volume driver stack of particular USB storage device including the particular steps of FIG. 4, this disclosure contemplates any suitable method for filtering any suitable volume driver stack of any suitable USB storage device including any suitable steps, which may include all, some, or none of the steps of FIG. 4, where appropriate. Furthermore, although this disclosure describes and illustrates particular components, devices, or systems carrying out particular steps of FIG. 4, this disclosure contemplates any suitable combination of any suitable components, devices, or systems carrying out any suitable steps of FIG. 4.

Figure 5:
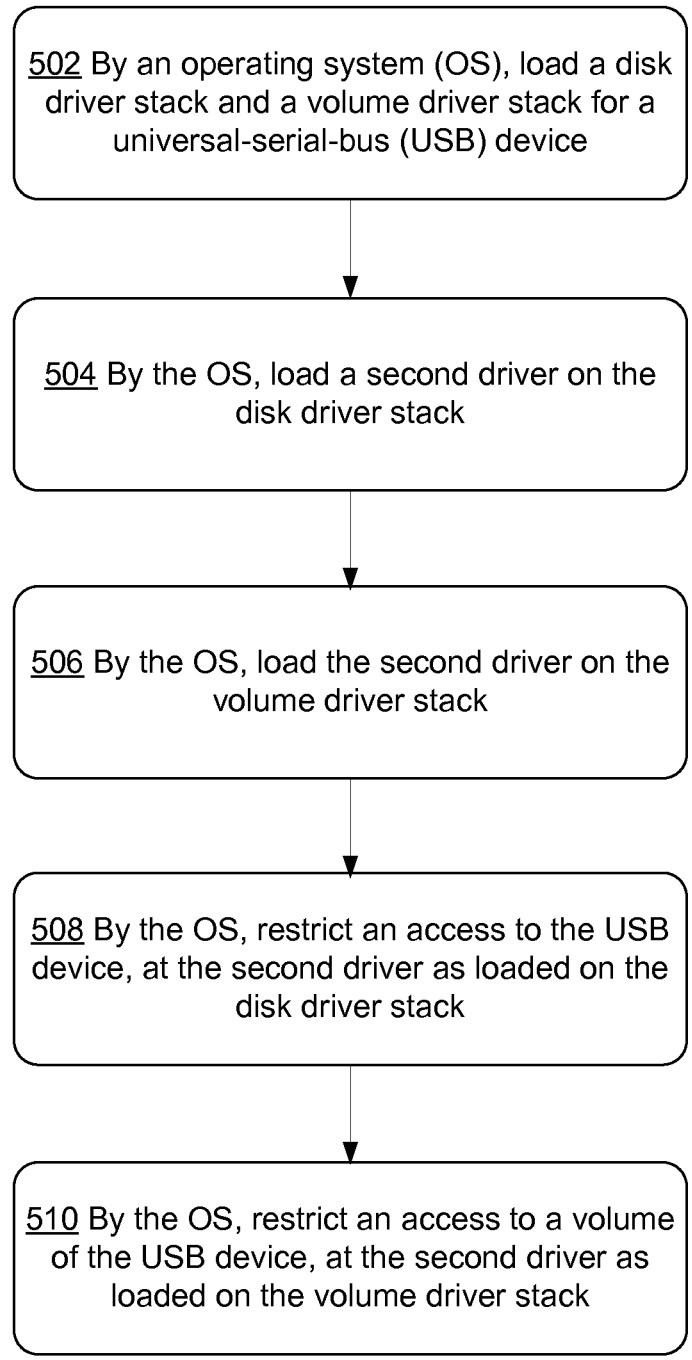
FIG. 5 is an example of a method to implement session-level-restriction (SLR) for a USB storage device.

FIG. 5 illustrates an example method to implement SLR for a USB device. In particular embodiments, the USB device may be a USB storage device, as discussed above. In step 502 of FIG. 5, an OS may load a disk driver stack and a volume driver stack for the USB device. In particular embodiments, the OS may be a VM OS of FIGS. 3 and 4. As such, the USB device may operate in the VM OS, as discussed above. In particular embodiments, the disk driver stack may be the disk driver stack of FIG. 3 and the volume driver stack may be the volume driver stack of FIG. 4. In step 504 of FIG. 5, the OS may load (i.e. layer) a second driver on the disk driver stack. In particular embodiments, the second driver may be the SLR driver of FIG. 3. In step 506 of FIG. 5, the OS may load (i.e. layer) the second driver of step 504 on the volume driver stack. In particular embodiments, the second driver may be DELL WYSE's TSREST.SYS. In step 508 of FIG. 5, the OS may restrict an access to the USB device at the second driver as loaded on the disk driver stack. In particular embodiments, step 508 may encompass one or more of steps 302-312 of FIG. 3, where appropriate. In step 510 of FIG. 5, the OS may restrict an access to a volume of the USB device at the second driver as loaded on the volume driver stack. In particular embodiments, step 510 may encompass one or more of steps 402-414 of FIG. 4, where appropriate. Although this disclosure describes and illustrates particular steps of FIG. 5 as occurring in a particular order, this disclosure contemplates any suitable steps of FIG. 5 occurring in any suitable order. Moreover, although this disclosure describes and illustrates an example method for implementing SLR for particular USB device including the particular steps of FIG. 5, this disclosure contemplates any suitable method for implementing SLR for any suitable USB device including any suitable steps, which may include all, some, or none of the steps of FIG. 5, where appropriate. Furthermore, although this disclosure describes and illustrates particular components, devices, or systems carrying out particular steps of FIG. 5, this disclosure contemplates any suitable combination of any suitable components, devices, or systems carrying out any suitable steps of FIG. 5.

In particular embodiments, a hidden volume (i.e. storage partition) of a SLR-enabled USB storage device operating may be accessed as a virtual volume. In particular embodiments, the SLR-enabled USB storage device may comprise one or more volumes (i.e. storage partitions) that are hidden from one or more users of the VM OS. In particular embodiments, the SLR-enabled USB storage device may operate in a terminal server environment. As an example and not by way of limitation, the terminal server environment may include client device 220 (e.g. a thin client, a slim client, or a lean client) being operated by a VDI that allows client device 220 to communicate with server 240, as discussed above. In particular embodiments, the method of FIG. 5 may allow a plurality of software components associated with the SLR-enabled USB storage device to seamlessly and securely operate in the terminal server environment. To access a hidden volume of the SLR-enabled USB storage device, a software component associated with the SLR-enabled USB storage device may request a user to enter a password. In particular embodiments, if the password as entered by the user is correct (i.e. matches a pre-determined password), the user may access and utilize the hidden volume as a virtual volume. Although the disclosure describes accessing particular hidden volume of particular SLR-enabled USB storage device in a particular manner, the disclosure contemplates accessing any suitable hidden volume of any suitable SLR-enabled USB storage device in any suitable manner.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:
1. A method comprising:
by a virtual machine operating system:
loading a disk driver stack and a volume driver stack for a Universal Serial Bus (USB) device, the USB device being enumerated by a first driver and operating in the virtual machine operating system, wherein the disk driver stack manages the USB device, wherein managing the USB device comprises monitoring a health of the USB device, wherein the disk driver stack comprises one or more class filter drivers and one or more disk upper filter drivers associated with the virtual machine operating system for the USB device and wherein the volume driver stack comprises one or more volume upper filter drivers and a volume manager driver;
loading a second driver on the disk driver stack, wherein the second driver comprises at least a session level restriction filter driver;
loading the second driver on the volume driver stack;
receiving a storage number corresponding to a volume of the USB device;
forming a symbolic link corresponding to the storage number;
retrieving a disk device object of the disk driver stack for the USB device, the disk device object being associated with a volume of the USB device, wherein the disk device object is retrieved based on the symbolic link;

restricting an access to the USB device at the second driver as loaded on the disk driver stack; and restricting an access to a volume of the USB device at the second driver as loaded on the volume driver stack, wherein restricting the access to the volume of the USB device comprises restricting the access by a user to the volume of the USB device at the second driver as loaded on the disk driver stack.

2. The method of claim 1, wherein the USB device is associated with at least two driver stacks.

3. The method of claim 1, wherein the USB device is a storage device.

4. The method of claim 1, wherein restricting the access to the USB device comprises limiting the access to a user session.

5. The method of claim 1, wherein restricting the access to the volume of the USB device comprises limiting the access to a user session.

6. The method of claim 1, wherein restricting the access to the USB device at the second driver comprises:

by the operating system:

determining whether the first driver that enumerates the USB device is a predetermined third-party virtual BUS driver;

determining whether a session-level-restriction (SLR) is enabled for the disk driver stack; and if the first driver substantially matches the pre-determined third-party virtual BUS driver and the SLR is enabled for the disk driver stack, restricting the access to the USB device.

7. The method of claim 1, wherein restricting the access to the volume of the USB device at the second driver comprises:

by the operating system:

determining whether the disk device object is enumerated by the first driver;

determining whether a session-level-restriction (SLR) is enabled for the disk driver stack; and if the disk device object is enumerated by the first driver and the SLR is enabled for the disk driver stack, restricting the access to the volume of the USB device.

8. The method of claim 1, wherein restricting the access to the volume of the USB device at the second driver comprises:

by the operating system:

retrieving a password to access the volume of the USB device, wherein the volume is hidden;

determining whether the retrieved password matches a stored password, the stored password being associated with the hidden volume of the USB device;

if the retrieved password matches the stored password, then:

establishing the hidden volume as a virtual volume; and providing the access to the virtual volume of the USB device; and if the retrieved password does not match the stored password, restricting the access to the hidden volume of the USB device.

9. One or more computer-readable non-transitory storage media embodying logic that is operable when executed to:

by a virtual machine operating system:

loading a disk driver stack and a volume driver stack for a Universal Serial Bus (USB) device, the USB device being enumerated by a first driver and operating in the virtual machine operating system, wherein the disk driver stack manages the USB device, wherein managing the USB device comprises monitoring a health of the USB device, and wherein the disk driver stack comprises one or more class filter drivers and one or more disk upper filter drivers associated with the virtual machine operating system for the USB device;

loading a second driver on the disk driver stack, wherein the second driver comprises at least a session level restriction filter driver;

loading the second driver on the volume driver stack;

receiving a storage number corresponding to a volume of the USB device;

forming a symbolic link corresponding to the storage number;

retrieving a disk device object of the disk driver stack for the USB device, the disk device object being associated with a volume of the USB device, wherein the disk device object is retrieved based on the symbolic link;

restricting an access to the USB device at the second driver as loaded on the disk driver stack; and restricting an access to the volume of the USB device at the second driver as loaded on the volume driver stack, wherein restricting the access to the volume of the USB device comprises restricting the access by a user to the volume of the USB device by not passing through an access request to the disk device object.

10. The media of claim 9, wherein the USB device is associated with at least two driver stacks.

11. The media of claim 9, wherein the USB device is a storage device.

12. The media of claim 9, wherein restricting the access to the USB device at the second driver comprises:

by the operating system:

determining whether the first driver that enumerates the USB device is a pre-determined third-party virtual BUS driver;

determining whether a session-level-restriction (SLR) is enabled for the disk driver stack; and if the first driver substantially matches the pre-determined third-party virtual BUS driver and the SLR is enabled for the disk driver stack, restricting the access to the USB device.

13. The media of claim 9, wherein restricting the access to the volume of the USB device at the second driver comprises:

by the operating system:

determining whether the disk device object is enumerated by the first driver;

determining whether a session-level-restriction (SLR) is enabled for the disk driver stack; and if the disk device object is enumerated by the first driver and the SLR is enabled for the disk driver stack, restricting the access to the volume of the USB device.

14. The media of claim 9, wherein restricting the access to the volume of the USB device at the second driver comprises:

by the operating system:

retrieving a password to access the volume of the USB device, wherein the volume is hidden;

determining whether the retrieved password matches a stored password, the stored password being associated with the hidden volume of the USB device;

if the retrieved password matches the stored password, then:
    establishing the hidden volume as a virtual volume; and
    providing the access to the virtual volume of the USB device; and
if the retrieved password does not match the stored password, restricting the access to the hidden volume of the USB device.

15. An information handling system comprising:
one or more processors; and
a memory coupled to the processors comprising instructions executable by the processors, the processors being operable when executing the instructions to:
by a virtual machine operating system:
    loading a disk driver stack and a volume driver stack for a Universal Serial Bus (USB) device, the USB device being enumerated by a first driver and operating in the virtual machine operating system, wherein the disk driver stack manages the USB device, wherein managing the USB device comprises monitoring a health of the USB device, and wherein the disk driver stack comprises one or more class filter drivers and one or more disk upper filter drivers associated with the virtual machine operating system for the USB device;
    loading a second driver on the disk driver stack, wherein the second driver comprises at least a session level restriction filter driver;
    loading the second driver on the volume driver stack;
    receiving a storage number corresponding to a volume of the USB device;
    forming a symbolic link corresponding to the storage number;
    retrieving a disk device object of the disk driver stack for the USB device, the disk device object being associated with a volume of the USB device, wherein the disk device object is retrieved based on the symbolic link;
    restricting an access to the USB device at the second driver as loaded on the disk driver stack; and
    restricting an access to a volume of the USB device at the second driver as loaded on the volume driver stack, wherein restricting the access to the volume of the USB device comprises restricting the access by a user to the volume of the USB device.

16. The information handling system of claim 15, wherein the USB device is a storage device.

17. The information handling system of claim 15, wherein restricting the access to the USB device at the second driver comprises:
by the operating system:
    determining whether the first driver that enumerates the USB device is a predetermined third-party virtual BUS driver;
    determining whether a session-level-restriction (SLR) is enabled for the disk driver stack; and
    if the first driver substantially matches the predetermined third-party virtual BUS driver and the SLR is enabled for the disk driver stack, restricting the access to the USB device.

18. The information handling system of claim 15, wherein restricting the access to the volume of the USB device at the second driver comprises:
by the operating system:
    determining whether the disk device object is enumerated by the first driver;
    determining whether a session-level-restriction (SLR) is enabled for the disk driver stack; and
    if the disk device object is enumerated by the first driver and the SLR is enabled for the disk driver stack, restricting the access to the volume of the USB device.

19. The information handling system of claim 15, wherein restricting the access to the volume of the USB device at the second driver comprises:
by the operating system:
    retrieving a password to access the volume of the USB device, wherein the volume is hidden;
    determining whether the retrieved password matches a stored password, the stored password being associated with the hidden volume of the USB device;
    if the retrieved password matches the stored password, then:
        establishing the hidden volume as a virtual volume; and
        providing the access to the virtual volume of the USB device; and
    if the retrieved password does not match the stored password, restricting the access to the hidden volume of the USB device.

* * * * *